United States Patent [19]

Möllerstedt et al.

[11] 4,000,244
[45] Dec. 28, 1976

[54] WET-CHEMICAL DIGESTION OF MOLYBDENUM SULPHIDE CONTAINING MATERIAL

[75] Inventors: Bengt Olov Pontus Möllerstedt; Karl-Erik Bäckius, both of Ljungaverk, Sweden

[73] Assignee: Molyscand AB, Ljungaverk, Sweden

[22] Filed: Apr. 30, 1975

[21] Appl. No.: 573,181

Related U.S. Application Data

[63] Continuation-in-part of Ser. No. 438,069, Jan. 30, 1974, abandoned.

[30] Foreign Application Priority Data

Jan. 30, 1973   Sweden ..................... 730/284

[52] U.S. Cl. .................................. 423/54; 423/49; 423/56; 423/58; 423/606; 423/593
[51] Int. Cl.² ............................... C01G 39/00
[58] Field of Search ........... 423/49, 54, 53, 56, 423/606

[56] References Cited

UNITED STATES PATENTS

| | | |
|---|---|---|
| 3,739,057 | 6/1973 | Daugherty et al. ................ 423/54 |
| 3,751,555 | 8/1973 | Peterson ........................... 423/54 |
| 3,860,419 | 1/1975 | Weber et al. ....................... 423/53 |

OTHER PUBLICATIONS

Bjorling et al., "Result of Papers Published from International Mineral Congress, Technical Papers, 7th Meeting", New York, N.Y., 1964, published 1965, pp. 127–138.

*Primary Examiner*—Herbert T. Carter
*Attorney, Agent, or Firm*—Fred Philpitt

[57] ABSTRACT

The present invention relates to a special process for the recovery of molybdenum by the wet-chemical digestion of molybdenum sulphide containing materials by means of nitric acid. The invention relates especially to the combination of a leaching procedure (that provides a very pure molybdenum oxide) and a liquid extraction procedure for the recovery of molybdenum and other values from the residual solution that is left over from the leaching procedure.

4 Claims, 1 Drawing Figure

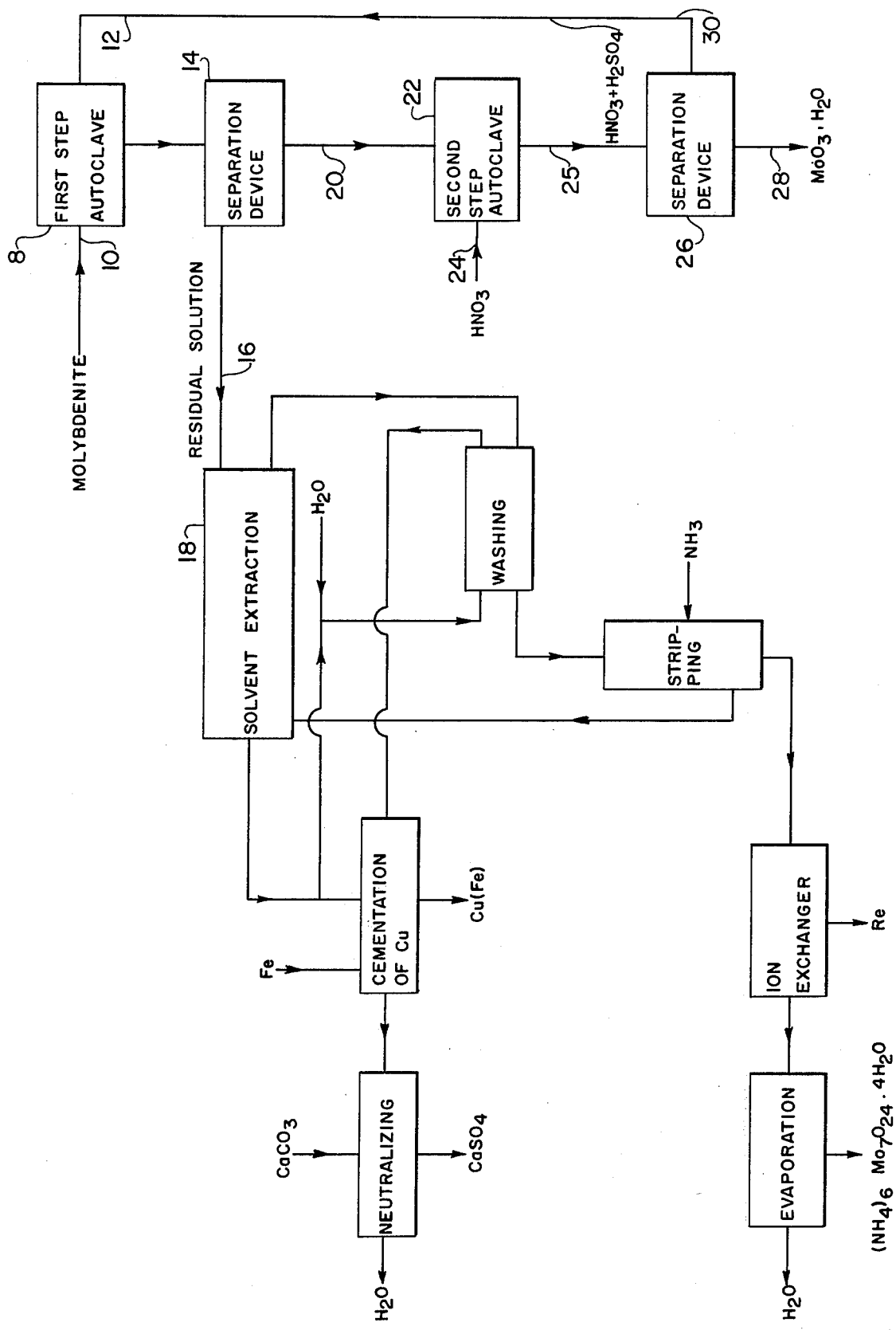

4,000,244

WET-CHEMICAL DIGESTION OF MOLYBDENUM SULPHIDE CONTAINING MATERIAL

RELATED CASE

This application is a continuation-in-part of our prior application Ser. No. 438,069, filed Jan. 30, 1974 and now abandoned.

PRIOR ART METHODS

According to one known method which is used commercially molybdenum sulfide containing materials (usually molybdenite) are roasted in order to convert the molybdenum sulfide to molybdenum oxide. However, this process has several disadvantages. First of all, in the roasting process a vigorous development of sulphur dioxide is obtained, which is unfavorable from an environmental point of view. Secondly, the rhenium values in the molybdenum sulphide containing material are volatilized in the roasting process and escape with the effluent gases. As a consequence it is necessary to provide the roaster with expensive purification means, partly in order to remove sulphur dioxide and partly to recover the rhenium oxide. A further economical disadvantage is that only those molybdenum sulphide containing materials which contain very high contents of molybdenum can be subjected to roasting. This means that the concentration of the crushed molybdenum sulphide containing mineral, which primarily occurs by means of floatation, must be carried very far, usually up to a content of molybdenum of about 55%. In roasting of other molybdenum sulphide containing mineral containing so large amounts of impurities of other metal sulphides, primarily lead, copper and bismuth, that the molybdenum oxide obtained will not be pure enough to be directly used for, e.g., alloying purposes, the resulting product must also be purified. This oxidation product can be purified by treatment with sulphuric acid for removal of contaminating oxides. In this process also minor amounts of molybdenum are released in the form of molybdate ions, which must be recovered to make the process profitable.

Another known process is the wet-chemical digestion of molybdenum sulphide containing materials with nitric acid. In this process the nitric acid will oxidize all the metal compounds present in the mineral, usually sulphides of zinc, iron, copper, lead, bismuth, rhenium, nickel, cobalt and manganese. Large amounts of the molybdenum sulphide will then be converted into molybdic acid, which is sparingly soluble in the reaction mixture. An advantage of this process is that a molybdenum sulphide containing material can be used as starting material, which contains low values of other metal sulphides, without the resulting molybdic acid being contaminated by the other metals, as these other oxidized metals appear as compounds soluble in the leach solution at the low pH values present. The reaction product after the wet-chemical digestion of molybdenum sulphide containing material with nitric acid substantially consists of gangue, precipitated molybdic acid, about 10–15% of digested molybdenum in the form of soluble molybdate ions, soluble compounds of the other included metals, sulphuric acid which is formed during the reaction, and non-consumed nitric acid. In order to recover molybdenum in the form of pure molybdenum compounds this reaction product can be contacted with ammonia or some other alkaline medium, whereby all the molybdenum will be converted to ammonium molybdate, which can then be crystallized. However, this method is not economically profitable because of the large amounts of ammonia consumed. Moreover, a great number of other metals will be coprecipitated in the form of oxides. Thus the ammonium paramolybdate directly obtained will be impure and comprehensive recrystallizations must be carried out to get it pure.

In Swedish Pat. No. 338,168 another process for recovering molybdenum is described, wherein the molybdic acid is filtered off from the reaction product after the leaching and the resulting filtrate consisting of sulphuric acid, soluble metal compounds and nitric acid is alkalized and is treated with hydrogen sulphide. All included metal compounds except molybdenum will then be precipitated in the form of sulphides. Then the filtrate is acidified again to recover molybdenum sulphide. However, in this process large amounts of alkali agents are also consumed and the treatment with hydrogen sulphide is relatively complicated. Moreover, this process does not make possible any recovery of rhenium, which is a disadvantage with respect to the profitability of the process.

OUR INVENTION GENERALLY

We have discovered a method for the wet-chemical digestion of molybdenum sulphide containing materials, wherein the disadvantages mentioned above are avoided. According to our process molybdenum compounds of a high purity are recovered, which can be further treated to produce pure molybdenum. Moreover, our process does not require the large amounts of alkalizing agents heretofore considered necessary in order to neutralize the acidic leach solution. Furthermore, the rhenium values present in the molybdenum containing starting material can be quantitatively recovered, which significantly improves the profitability of the process. Problems with air pollution are also avoided because the nitrous gases formed in the reaction can be easily recovered to form nitric acid.

The process according to the invention comprises a combination of a special leaching procedure and the solvent extraction of the residual solution obtained from the leaching procedure.

Considered from one rather specific aspect, our invention involves a process for the treatment of molybdenum sulfide containing material which comprises:

a. agitating together molybdenum sulfide containing material with an acidic solution containing nitric acid under temperature and pressure conditions which will enable the nitric acid to convert a substantial portion of the molybdenum sulfide to molybdic acid, b. separating the reaction products of step (a) into a liquid phase and a solid phase, c. the nitric acid content of the acidic solution in step (a) being regulated so that the liquid phase resulting from step (b) is free from nitric acid, d. subjecting the liquid phase resulting from step (b) to solvent extraction with an organic solvent which is capable of dissolving therein most of the molybdenum values contained in the liquid phase resulting from step (b), e. contacting the solid phase resulting from step (b) with a quantity of nitric acid which is at least sufficient to completely convert all of the molybdenum sulfide in said solid phase to molybdic acid.

THE INVENTION IN GREATER DETAIL

A molybdenum sulfide containing material, such as molybdenite, is a preferred raw material for our process. It preferably should contain at least 25% by weight of molybdenum and desirably a grain size within the range of from about 0.2 mm to about 0.01 mm in order to attain a sufficient digestion velocity. In what can be considered as the first step of our process, this molybdenum sulfide containing material is brought into contact with an acidic solution containing nitric acid. The source of the acidic solution is not critical but we have found that from the standpoint of economy it is best to use the acidic solution which is left over from a subsequent stage of our process, which will be described in detail hereinafter. The important thing with respect to the acidic solution is that the nitric acid contained therein should be completely consumed in the first step, such "consumption" being by virtue of its oxidation of molybdenum sulfide. Looked at in another way, the amount of nitric acid present in the acidic solution is less than that which is stoichiometrically necessary to convert all of the molybdenum sulfide to molybdenum oxide. The reason why this "deficit" quantity of nitric acid is necessary will be described hereinafter.

the molybdenum sulfide containing material and the acidic solution should be brought together in an autoclave or leaching vessel under conditions of vigorous agitation and at a temperature between 60° and 120° C (and preferably between 85° and 105° C). Normally the reaction is not dependent on pressure, and atmospheric pressure or moderately elevated pressures are preferred. The nitric acid should have an initial concentration of more than 20%, preferably within the range of 35–60%, in order to obtain a sufficient reaction velocity.

When it has been determined by analysis that the nitric acid has been consumed, the contents of the first step autoclave (or digester) are passed to a first separation device so that there can be a separation of the liquid and solid phases.

The liquid phase, which we also refer to as the "residual solution," should be free from nitric acid. This liquid phase or residual solution is extremely acid with a pH of about −0.8 and contains about 20–30% of sulphuric acid, about 2% of molybdenum and small amounts of metal ions which were initially present in the molybdenum sulphide containing material charged to the first step in the form of sulphides.

The solid phase from the first separation device is primarily composed of unoxidized molybdenum sulfide containing material, precipitated molybdic acid and gangue, and is preferably passed to a second step autoclave or leaching vessel where it is contacted with nitric acid under essentially the conditions that existed in the first step described above. In this second step the amount of nitric acid should be in excess of that stoichiometrically required to convert all of the molybdenum sulfide to molybdenum oxide. In this second step all of the metal sulfides in the molybdenum containing material will be oxidized to their highest valence and there will be an excess of unreacted nitric acid.

The contents of the second step autoclave or leaching vessel are passed to a second separating device so as to separate the liquid and solid phases.

The liquid phase separated from the second separating device comprises unreacted nitric acid, sulfuric acid (formed by reaction of the nitric acid with sulfides) and other dissolved metal ions. This liquid phase is preferably used as the acidic solution that is contacted with the molybdenite in the previously described first step of our process.

The solid phase separated from the second separating device can be considered as a leach residue and is primarily composed of molybdic acid (Mo . $O_3$ . $H_2O$) and gangue. This solid phase can be thereafter further treated or processed for the recovery of molybdenum oxide.

The residual solution from the first separation step is subjected to solvent extraction with an organic solvent which is capable of dissolving therein most of the molybdenum and rhenium values contained in the residual solution. A tertiary alkyl amine with one alkyl chain containing 6–20 carbon atoms or mixtures thereof is preferably used in the solvent extraction process. It is also possible to use synthetic alkyl amine resins or quaternary ammonium compounds. To enhance the extraction different types of alkyl phosphate esters can also be introduced such as trialkyl phosphate, dialkyl phosphonate, alkyl diphosphinate, trialkyl phosphine oxide or dialkyl phosphoric acid, wherein the alkyl chain contains 3–10 carbon atoms, e.g., tributyl phosphate $(BuO)_3PO$, dibutyl phosphonate $(BuO)_2P(O)Bu$, butyl phosphinate $BuOP(O)Bu_2$, di-2-ethylhexyl phosphoric acid etc. The amount of these phosphorous compounds might be 50–250% of the amount of the amine, preferably 50–150%. Other components in the organic phase of the solvent extraction can include an inert organic solvent, such as a low boiling petroleum fraction, e.g., kerosene, benzene, toluene, etc. Moreover, it can also be advantageous to add minor amounts, usually up to about 15%, of a third phase inhibitor, e.g., a long chain aliphatic alcohol, such as dodecanol. The organic phase preferably consists of 10–30% by weight of amine, optionally 10–30% by weight of a phosphorous compound, 0–15% by weight of a third phase inhibitor and the rest a petroleum fraction. The ratio of aqueous phase : organic phase in the extraction process can be within the range of about 1:0.3 to 1:2.5, and preferably from about 1:0.7 to 1:1.5.

The extraction of the residual solution is suitably carried out in so-called mixer-settlers, where the pure organic phase extracts the acidic leach solution countercurrently. However, nearly any known device for solvent extraction can be used.

After solvent extraction the organic phase can be washed with, e.g., sulphuric acid, for instance that obtained from the aqueous solution depleted of metal ions after the solvent extraction, in order to remove copper and iron ions co-extracted in the solvent extraction. The sulphuric acid should be diluted to a pH of about 1.5–3.5. The washed organic phase is thereafter treated with ammonia or ammonium ions to convert the molybdate and perrhenate ions in ammonium paramolybdate and ammonium perrhenate, which compounds are water-soluble. The organic phase, which has been freed from molybdenum and rhenium through this treatment with ammonia, can then be reused in the solvent extraction process.

The aqueous solution of ammonium paramolybdate and ammonium perrhenate obtained after treating the organic phase with ammonia is then passed through a strongly basic anion exchanger, preferably in solid form, for separation of the perrhenate ions, while the raffinate, which now merely contains ammonium paramolybdate, is conveyed to a device for precipitation, e.g., crystallization. The resulting ammonium paramolybdate has a very high purity (i.e., higher than 99.94%) and can be used for preparation of very pure molybdenum. When the ion exchanger for separation of rhenium is saturated with respect to rhenium, it is eluated with perchloric acid for release of the perrhenate ions, whereafter rhenium is recovered from the eluate, e.g., by electrolysis or precipitation.

The aqueous phase obtained in the liquid extraction process and containing sulphuric acid as well as the other dissolved metal ions is passed — possibly in combination with the washing liquid for the organic phase — to a device for separation of included amounts of copper, e.g., by cementation on iron. The residual solution from the cementation step, which is still acidic, with respect to sulphuric acid, can for instance be used as pickling acid or be neutralized, e.g., by reaction with limestone.

It is previously known to extract metal ions from acid solutions by using so-called liquid ion exchangers. These preferably consist of secondary, tertiary or quaternary alkyl amines, wherein the alkyl chain consists of at least one group containing 6–20 carbon atoms. In this extraction process the acid solution containing metal ions is treated in one or more steps, whereby the metal ions are transferred to the organic phase, from which they can be separated later.

However, the application of this extraction technique to the residual solution obtained by the leaching of molybdenum sulphide containing material with nitric acid and the subsequent separation of molybdic acid will result in a very low yield of molybdenum in the organic phase (i.e., the distribution coefficient of molybdenum in the organic phase is very low) and therefore a very great number of extraction stages are necessary for a substantially complete extraction of molybdenum from the acid aqueous phase to the organic phase. Therefore the process is not industrially economical.

We were therefore most surprised to find that it is possible to obtain satisfactory results with the technique of solvent extraction, providing that the digestion of the molybdenum sulphide containing material is carried out in such a way that the nitric acid is completely consumed in the step before the solvent extraction and the residual solution brought to solvent extraction thus is free from nitric acid. We were also surprised that the technique of solvent extraction is applicable to the extremely acid solution obtained after the completed reaction. Quite unexpectedly we found that additional metal ions except molybdenum, rhenium, copper and iron are not coextracted in the solvent extraction process and consequently do not give rise to impurities in the end product, as might be expected, as a great number of other metal ions are present in the residual solution.

EXAMPLES

The following examples are intended to represent two very specific examples of our process. The description in the examples have been correlated with the attached schematic flow sheet with the thought that this correlation will make the examples clearer.

Unless otherwise stated in the examples the parts are by weight and the temperature is in ° C and the pressure is atmospheric.

The molybdenite utilized in the examples had a grain size substantially within the range of from 0.1 to 0.05 mm and when analyzed by atomic absorption spectroscopy in respect of the amount of included metals, the following values in % by weight being obtained:

| Mo | Cu | Fe | Pb | Bi | Re | Other soluble metals | Gangue |
|---|---|---|---|---|---|---|---|
| 46 | 3 | 4 | 0.08 | 0.1 | 0.005 | approx. 1 | 5 |

EXAMPLE 1

Into a first step autoclave 8 there was charged both 434 kg of molybdenite (via line 10) and an acidic solution (i.e., an nitric acid-sulfuric acid solution) was introduced through line 12. The amount of the nitric acid introduced through line 12 was stoichiometrically insufficient to convert all of the molybdenum sulfide introduced through 10 into molybdenum oxide. After the contents of the first step autoclave were vigorously agitated together for 3 hours at about 90° C and under atmospheric pressure the contents were removed and passed to a separation device 14 where separation into liquid and solid phases was effected. The liquid phase (or "residual solution") which was separated had a sulfuric acid content of about 25% and was free from nitric acid.

All of the nitric acid was consumed in oxidizing the metal sulfides contained in the molybdenite. The solid phase separated (e.g., by settling) in the separation device 14 was composed of particles of both partially and completely oxidized molybdenite.

The aforementioned residual solution was taken away from the separation device via line 16 and introduced into a solvent extraction apparatus 18.

The solid phase separated in separation device 14 is then passed through line 20 into second step autoclave 22 together with 2,375 kg of a 40% nitric acid introduced through line 24. (It can be calculated that 2,375 kg of 40% nitric acid is the stoichiometric amount of acid required to completely oxidize 434 kg of said molybdenite.) Not all of the nitric acid introduced into the second step autoclave will be reacted because some of the molybdenum coming into the second step autoclave has already been oxidized in the first stage autoclave. After a reaction time of about 3 hours at 90° C at atmospheric pressure and under vigorous agitation the oxidation of molybdenum sulfides is practically 100% and the suspension in the autoclave 22 amounts to a solution of nitric acid and sulphuric acid with slurried molybdic acid and gangue. The molybdic acid and the gangue are separated from the acid solution in a second separation device 26 and the acid solution is transferred via line 30 to the autoclave 8 where it may be used for leaching of a fresh charge of molybdenite, as described above. The molybdic acid and gangue removed thru 28 are separated and then dried and calcined and of the 434 kg of molybdenite charged through 10, 270 kg of a molybdenum oxide concentrate is obtained from outlet 28 having the following wt. % analysis:

| Mo | Cu | Fe | Bi | Zn | Pb | Al |
|---|---|---|---|---|---|---|
| 59.9 | 0.03 | 0.11 | 0.02 | 0.003 | 0.016 | 0.80 |
| Mn | Ti | Mg | Sn | Si | S | Re |
| 0.002 | 0.01 | 0.09 | 0.04 | 3.04 | 0.06 | traces thereof |

-continued

The rest is substantially all oxygen.

The rest is substantially all oxygen.

The residual solution removed through line 16 consisted of about 2000/l of a 25% sulphuric acid (pH about −0.8) and had the following analysis, wherein the amounts are expressed in g/l.

| $H_2SO_4$ | Mo | Fe | Cu | Mg | Al | Zn | Ca | Sn | Cr | Si |
|---|---|---|---|---|---|---|---|---|---|---|
| 312.5 | 23.8 | 10.6 | 8.1 | 0.5 | 0.4 | 0.06 | 0.05 | 0.04 | 0.04 | 0.03 |
| Bi | Mn | Pb | Re | Ni | Ti | As | Ag | Sb | Hg | |
| 0.02 | 0.03 | 0.03 | 0.01 | 0.01 | 0.01 | 0.01 | 0.01 | traces | traces | |

The distribution coefficient of molybdenum, $D_{Mo}$, and rhenium, $D_{Re}$, was determined by extraction of 1 part of leach solution with 1 part of an organic liquid consisting of 20% by weight of a mixture of trioctylamine and tridecylamine, 10% by weight of dodecanol and 70% by weight of a kerosene fraction substantially free from aromates. The following values are obtained:
$D_{Mo} = 7.30$ and $D_{Re} = > 10^3$ This leach solution was extracted countercurrently in a device 18 for solvent extraction consisting of a mixer-settler battery of four units with the organic liquid described above. The ratio of aqueous phase : organic phase was 1:1. The organic phase obtained after the extraction contained 23.6 g/l of Mo and 0.01 g/l of Re. Thus 99% of the molybdenum included in the residual solution was transferred to the organic phase and substantially all rhenium.

Thus, in carrying out the process of the invention, molybdenum oxide of a very high purity as well as molybdenum values remaining in the residual solution with a yield of almost 100% have been recovered from the molybdenum containing material subjected to leaching with nitric acid.

The molybdenum transferred to the organic phase can thereafter be recovered according to known methods, and a preferred method is described below, which however is not a part of the present invention.

The organic phase obtained after the extraction is passed to a washing step, which consists of two mixer-settler stages, and is washed with 0.01 M $H_2SO_4$ to remove the Cu and Fe, which were coextracted. The sulphuric acid can preferably be obtained by dilution of the extracted leach solution with water. The organic phase freed from all ions but Mo and Re is then treated with 3 M caustic ammonia in a mixer-settler unit of three stages. Mo and Re will then be converted to a water-soluble ammonium paramolybdate and ammonium perrhenate.

This aqueous solution is passed through a strongly anion basic ion exchange, preferably in the form of a synthetic amine resin, for exchange of the perrhenate ion, and the raffinate is passed to an evaporation device for recovery of ammonium paramolybdate, $(NH_4)_6Mo_7O_{24} \cdot 4 H_2O$, whereby 75 kg of ammonium paramolybdate are recovered from the aqueous phase of the digestion described above. In using this technique on the worked leach solution as described above, 75 kg of ammonium paramolybdate having a purity of 99.94% are recovered, where the heaviest impurity is 100 ppm Fe.

The perrhenate ions can be discontinuously recovered from the ion exchanger by eluation with perchloric acid. Rhenium is then prepared from the eluate by means of electrolysis, whereby 20 g of rhenium being obtained.

EXAMPLE 2

In a comparative test 434 kg of molybdenite concentrate having the same grain size as used in Example 1 and the same analysis were charged into an autoclave together with 2,800 kg of a 40% nitric acid, viz, a stoichiometric excess of 18% of nitric acid. The leaching was carried out under vigorous agitation for 4 hours at 95° C and under atmospheric pressure. After completion of the leaching about 275 kg of molybdic acid having substantially the same composition as that obtained in Example 1 were filtered off.

The residual solution, approximately 2,350 l (pH about −0.8) has the following composition expressed in g/l.

| $H_2SO_4$ | $HNO_3$ | Mo | Fe | Cu | Mg | Al | Zn | Ca | Sn | Cr |
|---|---|---|---|---|---|---|---|---|---|---|
| 278 | 110 | 28.0 | 10.5 | 4.5 | 0.5 | 0.4 | 0.07 | 0.06 | 0.04 | 0.04 |
| Si | Bi | Mn | Pb | Re | Ni | Ti | As | Ag | Sb | Hg |
| 0.03 | 0.02 | 0.02 | 0.02 | 0.015 | 0.01 | 0.01 | 0.009 | 0.006 | 0.003 | 0.00003 |

The distribution coefficient of molybdenum, $D_{Mo}$, and of rhenium, $R_{Re}$, was determined in the same way as in Example 1 with the same organic phase. The following values were obtained:
$D_{Mo} = 0.046$ and $D_{Re} = 5.17$ This residual solution was also extracted in the same way and in the same apparatus that was used in Example 1. The organic phase obtained after the extraction contained only 4.3 g/l of molybdenum, which is too low a yield for the process to be utilized industrially. In order to obtain the same transfer of Mo to the organic phase that was obtained in Example 1 more than 20 mixer-settler stages would theoretically be required.

As is evident from these two comparative examples, the controls which we discovered relative to our digestion process and very important insofar as subsequent recovery of Mo values by solvent extraction is concerned.

MISCELLANEOUS

During the oxidation of the molybdenum sulphide containing material with nitric acid, nitrous gases will be formed. These gases can be discharged from the leaching vessels and for instance be used for the preparation of nitric acid. It is also possible to add oxygen at an overpressure to the reaction vessels to achieve formation in situ of nitric acid, which is directly used in the leaching. If this process is used in the leaching procedure according to the invention the charged amount of nitric acid must be adapted to new formation of nitric acid so that the amounts of nitric acid and molybdenum sulphide containing material will be substantially stoichiometric. The adaptation must be done in such a way that the nitric acid in the step before the solvent extraction is completely consumed.

By stoichiometric amount of nitric acid we mean the amount of nitric acid that is theoretically required for oxidation of the metal sulphides included in the molybdenum sulphide containing material to the highest oxidation step of the metals.

Although a process involving two leaching steps has been described, it should be understood that the leaching can be carried out in more than two steps. When using more than two steps it is only important that in the step from which the residual solution is to be separated for solvent extraction the amount of nitric acid introduced be limited so that the residual solution will be free from nitric acid.

Our process can be carried out in either a batchwise or continuous manner, or a combination thereof.

We claim:

1. A process for the treatment of molybdenum sulfide containing material which comprises:
   a. agitating together in a first leaching step molybdenum sulfide containing material with an acidic solution containing nitric acid under a temperature of 60°–120° C and pressure conditions which will enable the nitric acid to convert a substantial portion of the molybdenum sulfide to molybdic acid,
   b. withdrawing reaction products from said first leaching step, said reaction products being free from nitric acid, separating the reaction products of step (a) into a liquid phase and a solid phase,
   c. the nitric acid content of the acidic solution in step (a) being regulated so that the liquid phase resulting from step (b) is free from nitric acid,
   d. subjecting the liquid phase resulting from step (b) to solvent extraction with an organic solvent which is capable of dissolving therein most of the molybdenum values contained in the liquid phase resulting from step (b)
   e. contacting the solid phase resulting from step (b) in a second leaching step with nitric acid having an initial concentration of at least 20% in a quantity which is at least sufficient to completely oxidize all of the molybdenum sulphide in said solid phase, and
   f. separating the reaction products of step (e) into an acidic solution and solid molybdic acid.

2. A process for recovering molybdenum according to claim 1 characterized in that the liquid solution resulting from step (f) is used as the acidic solution for step (a) and said solvent extraction is carried out with an amine containing organic phase for recovery of residual molybdenum.

3. A process according to claim 2 characterized in that the amine containing organic phase contains at least one tertiary alkyl amine, wherein the alkyl chain has 6–20 carbon atoms.

4. A process according to claim 1 characterized in that the molybdenum sulphide containing material consists of molybdenite having a grain size within the range of from 0.2 to 0.01 mm.

* * * * *